US008825884B2

(12) United States Patent
Wang et al.

(10) Patent No.: US 8,825,884 B2
(45) Date of Patent: Sep. 2, 2014

(54) METHOD AND DEVICE FOR PROTOCOL IDENTIFICATION

(75) Inventors: Wenxue Wang, Shenzhen (CN); Jiaxing Huang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 405 days.

(21) Appl. No.: 13/339,182

(22) Filed: Dec. 28, 2011

(65) Prior Publication Data

US 2012/0137014 A1 May 31, 2012

Related U.S. Application Data

(63) Continuation of application No. PCT/CN2011/073931, filed on May 12, 2011.

(30) Foreign Application Priority Data

Nov. 30, 2010 (CN) .......................... 2010 1 0567587

(51) Int. Cl.
*G06F 15/16* (2006.01)
*H04L 29/06* (2006.01)

(52) U.S. Cl.
CPC ..................................... *H04L 69/22* (2013.01)
USPC ........................................................ 709/230

(58) Field of Classification Search
CPC .......... H04L 69/22; H04L 12/26; H04L 43/00
USPC ........................................ 709/230, 223–224
See application file for complete search history.

(56) References Cited

U.S. PATENT DOCUMENTS

| 2006/0233101 | A1* | 10/2006 | Luft et al. ...................... 370/229 |
| 2007/0133419 | A1* | 6/2007 | Segel ............................. 370/236 |
| 2009/0077228 | A1* | 3/2009 | Weil et al. ..................... 709/224 |

(Continued)

FOREIGN PATENT DOCUMENTS

| CN | 101414939 A | 4/2009 |
| CN | 101577644 A | 11/2009 |
| CN | 101741744 A | 6/2010 |
| CN | 102045347 A | 5/2011 |

OTHER PUBLICATIONS

Search Report and Written Opinion of the International Searching Authority issued in corresponding PCT Patent Application No. PCT/CN2011/073931, mail Aug. 30, 2011.

(Continued)

*Primary Examiner* — Philip B Tran
(74) *Attorney, Agent, or Firm* — Brinks Gilson & Lione

(57) ABSTRACT

A protocol identification method and a protocol identification device are provided. The protocol identification method includes acquiring a performance index of protocol characteristic information according to characteristic conditions of the protocol characteristic information; calculating identification probabilities of the protocol characteristic information employed by DPI under a preset statistical strategy according to a DPI identification result; determining an optimal sequence of all protocol characteristic information in a DPI identification library according to the performance index and the identification probabilities of the protocol characteristic information; and performing protocol identification on a received message according to the optimal sequence. The optimal sequence for protocol identification is determined according to the identification probabilities, the protocol characteristic information with a high match success probability may be matched first, and the protocol characteristic information with a high match failure probability may be matched later, which thereby improves the protocol match performance.

15 Claims, 6 Drawing Sheets

(56) References Cited

U.S. PATENT DOCUMENTS

| | | | |
|---|---|---|---|
| 2009/0300153 A1* | 12/2009 | Ray et al. | 709/223 |
| 2010/0067529 A1* | 3/2010 | Chen et al. | 370/392 |
| 2010/0192225 A1 | 7/2010 | Ma et al. | |
| 2010/0208590 A1* | 8/2010 | Dolganow et al. | 370/235 |

OTHER PUBLICATIONS

Search Report issued in corresponding Chinese Patent Application No. 2010105675876, mailed Oct. 28, 2012.

* cited by examiner

METHOD AND DEVICE FOR PROTOCOL IDENTIFICATION

CROSS-REFERENCE TO RELATED APPLICATIONS

This application is a continuation of International Application No. PCT/CN2011/073931, filed on May 12, 2011, which claims priority to Chinese Patent Application No. 201010567587.6, filed on Nov. 30, 2010, both of which are hereby incorporated by reference in their entireties.

FIELD

The present disclosure relates to the field of communications technologies, and in particular, to a method and device for protocol identification.

BACKGROUND

In common message inspection, only content under layer 4 of Internet Protocol (IP) packet are analyzed, including a source address, a target address, a source port, a target port, and a protocol type. In addition to the analysis of layer 4, Deep Packet Inspection (DPI) further includes an analysis of application layer, and identification of various applications and content of the various applications. By DPI technology, various applications in a network may be efficiently identified. At present, a DPI identification method existing in the industry includes pre-defining protocol characteristics, matching a data packet in the network with the characteristics, and identifying the matched data packet as a protocol matched. The predefined characteristic includes one or more characteristic conditions, and the characteristic conditions may be that the content of an application message matches some characters, meets a certain algorithm, meets a certain behavior pattern, or meets a combination of the above three conditions. In the same environment, decreasing match times may improve the protocol identification performance of the DPI, with the best performance being that once a data stream is input, match success is achieved after being matched with one characteristic.

In a conventional DPI match method, in order to decrease the match time, all characteristics in a characteristic library may be cascaded based on a certain specific order, and after a device runs, the match order of the characteristics is unchanged, so that the match performance becomes low.

SUMMARY

The present disclosure provides a protocol identification method and a protocol identification device, so as to solve a disadvantage in the prior art that protocol characteristics match performance is low, and to improve the protocol match performance.

An embodiment of the present disclosure provides a protocol identification method. The method includes: calculating identification probabilities of protocol characteristic information employed by DPI according to an identification result of the DPI performed on a received message, in which the identification probabilities represent the probability that the protocol characteristic information is employed according to a preset statistical strategy; determining an optimal sequence of the protocol characteristic information in a DPI identification library according to the identification probabilities, in which the optimal sequence determines a precedence order of the protocol characteristic information employed to identify subsequently received messages; and performing protocol identification on the subsequently received messages according to the optimal sequence.

An embodiment of the present disclosure further provides a protocol identification method. The method includes: acquiring performance indexes of protocol characteristic information according to characteristic conditions of the protocol characteristic information, in which the performance indexes represent resource consumption power for successfully identifying the protocol; determining an optimal sequence of the protocol characteristic information in a DPI identification library according to the performance indexes of the protocol characteristic information, in which the optimal sequence determines a precedence order of protocol characteristic information employed to identify subsequently received messages; and performing protocol identification on the subsequently received messages according to the optimal sequence.

An embodiment of the present disclosure provides a protocol identification device. The device includes: an identification probability statistics module, configured to calculate identification probabilities of protocol characteristic information employed by DPI according to an identification result of the DPI performed on a received message, in which the identification probabilities represent the probability that the protocol characteristic information is employed according to a preset statistical strategy; an optimal sequence determination module, configured to determine an optimal sequence of the protocol characteristic information in a DPI identification library according to the identification probabilities, in which the optimal sequence determines a precedence order of the protocol characteristic information employed to identify subsequently received messages; and a protocol identification module, configured to perform protocol identification on the subsequently received messages according to the optimal sequence.

An embodiment of the present disclosure provides a protocol identification device. The device includes: a performance index acquisition module, configured to acquire performance indexes of protocol characteristic information according to characteristic conditions of the protocol characteristic information, in which the performance indexes represent resource consumption power for successfully identifying the protocol; an optimal sequence determination module, configured to determine an optimal sequence of the protocol characteristic information in a DPI identification library according to the performance indexes of the protocol characteristic information, in which the optimal sequence determines a precedence order of protocol characteristic information employed to identify subsequently received messages; and a protocol identification module, configured to perform protocol identification on the subsequently received messages according to the optimal sequence.

According to the protocol identification method and the protocol identification device of the present disclosure, the optimal sequence for protocol identification may be determined according to the identification probabilities under the preset statistical strategy. Arrangement orders of the protocol characteristic information at different time and in different regions may be different, so that the protocol match performance may be different for the messages in a data stream of the same protocol input at different time and in different regions. Therefore, the protocol characteristic information with a high match success probability may be matched first, and the protocol characteristic information with a high match failure probability may be matched later, which thereby improves the protocol match performance.

BRIEF DESCRIPTION OF THE DRAWINGS

To illustrate the solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons skilled in the art may derive other drawings from the accompanying drawings without creative efforts.

DETAILED DESCRIPTION OF THE EMBODIMENTS

In order to make the objectives, solutions, and advantages of the present disclosure more comprehensible, solutions according to the embodiments of the present disclosure are clearly described with reference to accompanying drawings in the embodiments. It is obvious that the embodiments to be described are a part rather than all of the embodiments of the present disclosure. All other embodiments obtained by persons skilled in the art based on the embodiments of the present disclosure without creative efforts shall fall within the protection scope of the present disclosure.

Figure 1:
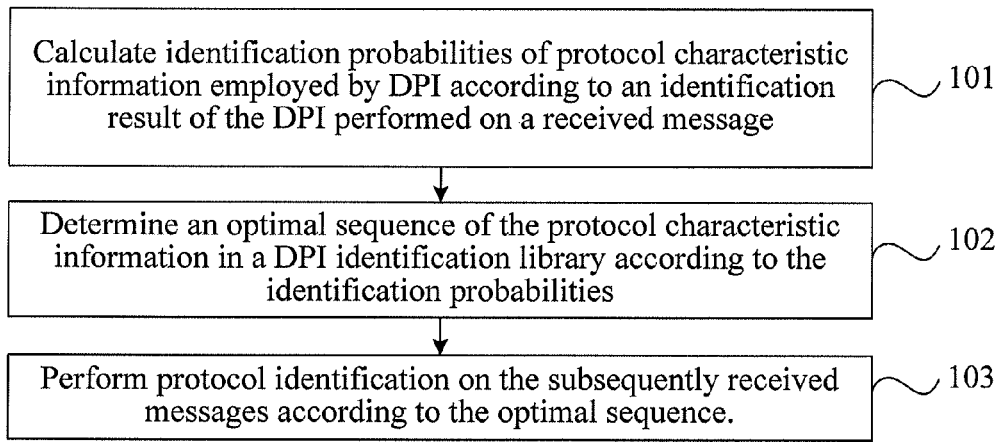
FIG. 1 is a flow chart of a first embodiment of a protocol identification method according to the present disclosure.

FIG. 1 is a flow chart of a first embodiment of a protocol identification method according to the present disclosure. As shown in FIG. 1, the protocol identification method includes the following steps:

Step 101: Calculate identification probabilities of protocol characteristic information employed by DPI according to an identification result of the DPI performed on a received message, in which the identification probabilities represent the probability that the protocol characteristic information is employed according to a preset statistical strategy.

Before step 101, a following step is included. Acquire performance indexes of the protocol characteristic information according to characteristic conditions of the protocol characteristic information, in which the performance indexes represent resource consumption power for successfully identifying the protocol.

Figure 2:
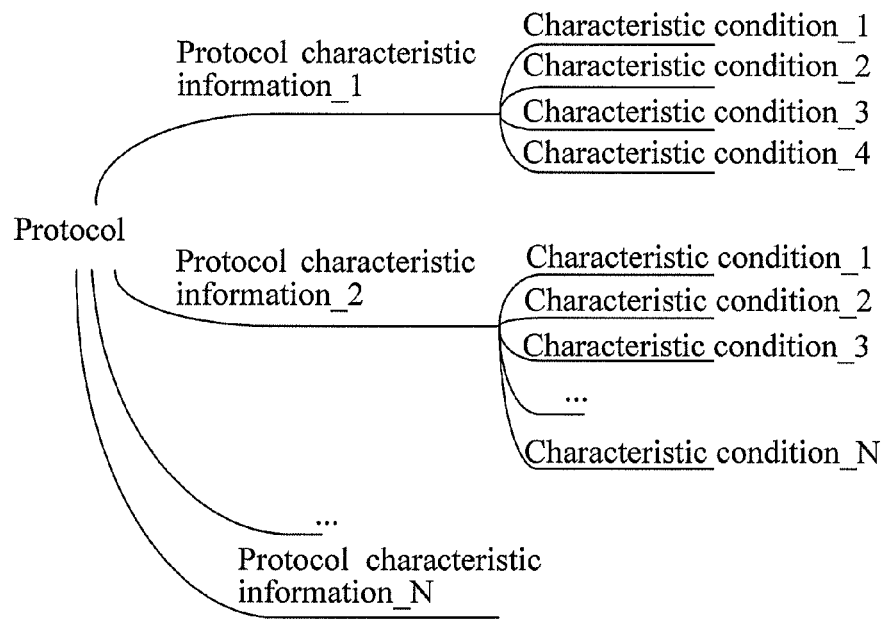
FIG. 2 is a schematic relation diagram of protocol-characteristics-conditions according to an embodiment of the present disclosure.

FIG. 2 is a schematic relation diagram of protocol-characteristics-conditions according to an embodiment of the present disclosure. As shown in FIG. 2, the relation between protocol characteristic information of a same protocol is "or", and the relation between characteristic conditions of a same piece of protocol characteristic information is "and". A performance index of one piece of protocol characteristic information may be calculated according to performance indexes of all characteristic conditions of the piece of protocol characteristic information.

The acquiring the performance indexes of the protocol characteristic information according to the characteristic conditions of the protocol characteristic information may includes acquiring performance indexes of all characteristic conditions of each piece of protocol characteristic information; and calculating the performance indexes of all the characteristic conditions according to a set algorithm, so as to obtain a performance index of the protocol characteristic information. The performance index represents resource consumption power for successfully identifying the protocol, such as time and/or memory consumption power for successfully identifying the protocol. Optionally, when the time and memory consumption power of a certain piece of protocol characteristic information for successfully identifying the protocol are low, the performance index is determined to be low; and when the time and memory consumption power of a certain piece of protocol characteristic information for successfully identifying the protocol are high, the performance index is determined to be high. Optionally, with the identification probabilities as a preference, a preliminary sequence of all protocol characteristic information in a DPI identification library is determined first according to the identification probabilities, and then an order of the preliminary sequence is determined according to the performance indexes, so as to determine an optimal sequence; or the preliminary sequence of all protocol characteristic information in the DPI identification library is first determined according to the performance indexes, and then the order of the preliminary sequence is determined according to the identification probabilities, so as to determine the optimal sequence of all the protocol characteristic information in the DPI identification library. It may be understood that, the optimal sequence of all the protocol characteristic information in the DPI identification library may be determined according to a certain strategy condition in combination with the identification probabilities and the performance indexes.

If a protocol type of a message in an input data stream is "known" in advance, protocol characteristic information of the protocol is arranged at a leading position of data to be matched for being matched, so times for matching is decreased due to the increased match success potential. In the embodiment of the present disclosure, according to a preset statistical strategy, a statistical analysis is made on characteristics that a message in a data stream matches, and that the message in a data stream having certain characteristics in a certain period of time has the highest identification probability is determined through statistics, and an arrangement order of the protocol characteristic information is adjusted according to the identification probabilities, so as to automatically improve the protocol match performance. The data streams of each protocol are not uniformly distributed in a network, as determined by the following factors: (a) Different countries and regions use different network software, and protocol data streams in the network are also different. For example, MSN software is frequently used in Europe and US, QQ software is frequently used in China, and therefore, the occurrence probability of protocol characteristic information of QQ in China is greater than that of protocol characteristic information of MSN. (b) In a same region and at different time, the protocol data streams in the network are all different due to different human activities. For example, daytime is a main period of time during which work and life proceed, and therefore, more software requiring human participation is used, and the occurrence probability of data streams of web browsing, Instant Message (IM) type protocol, or E-mail protocol is high; and at midnight, more software requiring no human participation is used, and therefore the occurrence probability of data streams of download type protocol such as BT or Thunder is high. (c) Due to the development of Internet, new network protocols continuously emerge, old network protocols disappear slowly, and therefore occurrence probabilities of data streams of each protocol change continuously.

Therefore, before step 101, the preset statistical strategy may be preset, in which the preset statistical strategy includes at least one of a set time period, a set region, and a set aging degree of a protocol.

Step 101 may include any one of the following:

Case 1: Calculate identification success probabilities of the protocol characteristic information employed by the DPI under the preset statistical strategy according to the identification result of the DPI performed on the received message.

Case 2: Calculate identification failure probabilities of the protocol characteristic information employed by the DPI under the preset statistical strategy according to the identification result of the DPI performed on the received message.

Step 102: Determine an optimal sequence of the protocol characteristic information in a DPI identification library according to magnitudes of the identification probabilities, in which the optimal sequence is used to determine a precedence order of the protocol characteristic information employed to identify subsequently received messages.

The optimal sequence of the protocol characteristic information may be directly determined according to the magnitudes of the identification probabilities following an order from high to low of the identification success probabilities, or following an order from low to high of the identification failure probabilities; and the optimal sequence of the protocol characteristic information may also be determined in light of the identification probabilities and the performance indexes. A specific process may include any one of the following manners:

Manner 1: Calculate, based on a preset function relation, external performance indexes corresponding to all the protocol characteristic information at different arrangement orders in the DPI identification library according to the performance indexes and the identification probabilities of the protocol characteristic information, and determine an arrangement order corresponding to a minimum external performance index to be the optimal sequence. It may be understood that the external performance indexes are performance indexes used to weight "the arrangement order of the protocol characteristic information", and are provided with respect to an arranged arrangement order.

Manner 2: Calculate internal performance indexes corresponding to all the protocol characteristic information in the DPI identification library according to the performance indexes and the identification probabilities of the protocol characteristic information, and determine an arrangement order of all the protocol characteristic information arranged according to an ascending order of the internal performance indexes as the optimal sequence, in which the internal performance indexes are ratios of the performance indexes to the identification success probabilities corresponding to the performance indexes, or products of the performance indexes and the identification failure probabilities corresponding to the performance indexes. It may be understood that the internal performance indexes are used to weight the performance indexes of the protocol characteristic information, and are provided to rank the protocol characteristic information with respect to the protocol characteristic information.

Step 103: Perform protocol identification on the subsequently received messages according to the optimal sequence.

In this embodiment, the optimal sequence for protocol identification is determined according to identification probabilities under the preset statistical strategy. The arrangement orders of the protocol characteristic information at different time and in different regions may be different, so that the protocol match performance may be different for the messages in a data stream of a same protocol input at different time and in different regions. Therefore, the protocol characteristic information with a high match success probability may be matched first, and the protocol characteristic information with a high match failure probability may be matched later, which thereby improves the protocol match performance. Alternatively, the identification probabilities and the performance indexes of the protocol characteristic information may be combined, so the protocol characteristic information having a low performance index and a high match success probability may be matched first, and the protocol characteristic information having a high performance index and a high match failure probability may be matched later, which thereby further improves the protocol match performance.

Figure 3:
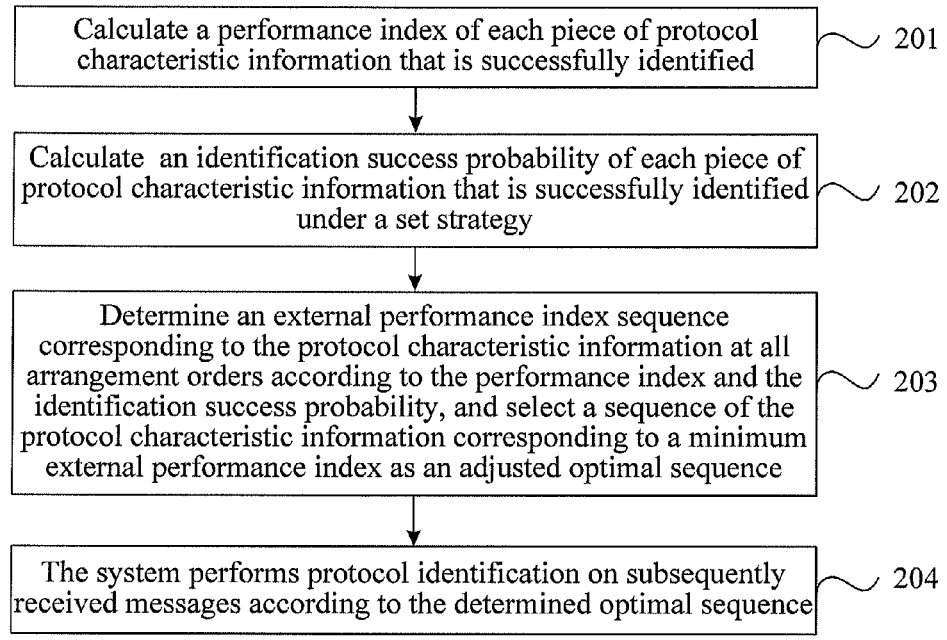
FIG. 3 is a flow chart of a second embodiment of a protocol identification method according to the present disclosure.
Figure 4:
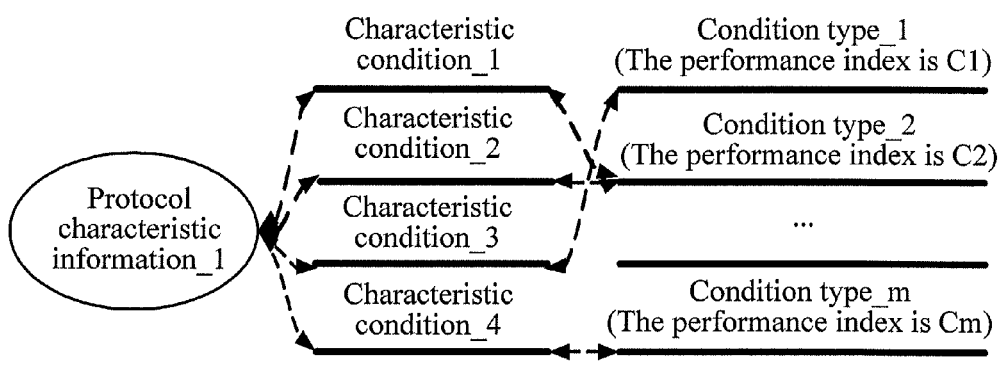
FIG. 4 is a schematic relation diagram of protocol characteristic information and performance indexes of characteristic conditions in the second embodiment of the protocol identification method according to the present disclosure.

FIG. 3 is a flow chart of a second embodiment of a protocol identification method according to the present disclosure. As shown in FIG. 3, on the basis of the first embodiment of the protocol identification method according to the present disclosure, the protocol identification method includes the following steps:

Step 201: Calculate a performance index R of each piece of protocol characteristic information that is successfully identified. A performance index of each piece of protocol characteristic information correlates only to all characteristic conditions of each piece of protocol characteristic information. In the same software and hardware environment, the performance indexes of the protocol characteristic information having the same characteristic conditions are the same. Therefore, the performance index of each protocol characteristic may be calculated in advance. FIG. 4 is a schematic relation diagram of protocol characteristic information and performance indexes of characteristic conditions in the second embodiment of the protocol identification method according to the present disclosure. For example, in FIG. 4, protocol characteristic information_1 is formed by 4 characteristic conditions, and performance indexes of condition types corresponding to the characteristic conditions are respectively $C1, C2, \ldots Cm$, and therefore performance index R1 of the protocol characteristic information_1 is $F(C1, C2, \ldots Cm)$. For example, a protocol A needs to be identified, and protocol characteristic information of the protocol A needs to meet two characteristic conditions A1 and A2 at the same time, in which A1 represents a third byte equal to "0x02", and A2 represents a fifth byte being a length of the data packet. Therefore, the performance index R of the protocol characteristic information of the protocol A is calculated as follows. As 1 performance unit is needed for matching a byte, 0.5 performance unit is needed for offsetting a pointer once, and 1.5 performance units are needed for matching the length once, 1+0.5+0.5+1.5=3.5 performance units are needed for matching A1 and A2. Therefore, it is concluded that the performance index R of the protocol characteristic information of the protocol A is 3.5. A number of the characteristic conditions of each piece of protocol characteristic information may be determined according to specific applications, and is not limited herein.

Step 202: Calculate an identification success probability P of each piece of protocol characteristic information that is successfully identified under a set strategy.

If the set strategy is a set time period, the time may be divided first, which may be automatically completed, or manually set. The granularity of the period of time may be 1 day, 1 week, or 1 year. For example, 1 day is divided into three set time periods (9:00-18:00, 18:00-0:00, and 0:00-9:00). After 1-month operation of a device, an identification success probability of each piece of protocol characteristic information in the three set time periods is calculated according to a statistical result. When the set strategy is a set region or an aging degree of the protocol, a statistical method of the identification probability is similar to that when the time is set.

Step 203: Determine an external performance index sequence corresponding to the protocol characteristic information at all arrangement orders according to the performance index and the identification success probability, and select a sequence of the protocol characteristic information corresponding to a minimum external performance index as an adjusted optimal sequence. For example, it is assumed a system includes m pieces of protocol characteristic information, a performance index corresponding to a pre-match sequence for protocol identification is Rx=(R1, R2, ..., Rm), an identification success probability sequence corresponding to each piece of protocol characteristic information is Px= (P1, P2, ..., Pm), an external performance index corresponding to the m pieces of protocol characteristic information at each arrangement order is Qx=F(Rx, Px), the arrangement order of the m pieces of protocol characteristic information is adjusted to obtain the external performance indexes corresponding to the m pieces of protocol characteristic information at different arrangement orders, and an external performance index sequence corresponding to the protocol characteristic information at all arrangement orders is determined to be (Q1, Q2, ..., Qn), in which m is an positive integer, n is a number of permutation and combination of the m pieces of protocol characteristic information. A minimum external performance index Qi=min(Q1, Q2, ..., Qm) is selected, a sequence Ri of the protocol characteristic information corresponding to the Qi is the sequence having the highest match efficiency, and is used as the adjusted optimal sequence. For example, it is assumed that a protocol includes two pieces of protocol characteristic information "1", and "2", and corresponding performance indexes are respectively R1 and R2, in a certain set time period, corresponding match success probabilities are respectively P1 and P2, and therefore two sequences of the protocol characteristic information, that is, two arrangement orders exit, namely, (1, 2) and (2, 1). Two external performance indexes corresponding to the two sequences may be respectively Q1=R1+(1−P1)*R2, and Q2=R2+(1−P2)*R1. A minimum external performance index Qi=min(Q1, Q2) is selected, and a sequence of the protocol characteristic information corresponding to the Qi is the adjusted optimal sequence.

Step 204: The system performs protocol identification on subsequently received messages according to the determined optimal sequence.

In this embodiment, the optimal sequence for protocol identification is determined according to the identification probabilities under the preset statistical strategy and the performance indexes of the protocol characteristic information. The arrangement orders of the protocol characteristic information at different time and in different regions may be different, so that the protocol match performance may be different in a data stream of the same protocol input at different time and in different regions. Therefore, the protocol characteristic information with a low performance index and a high match success probability may be matched first, which thereby improves the protocol match performance.

Figure 5:
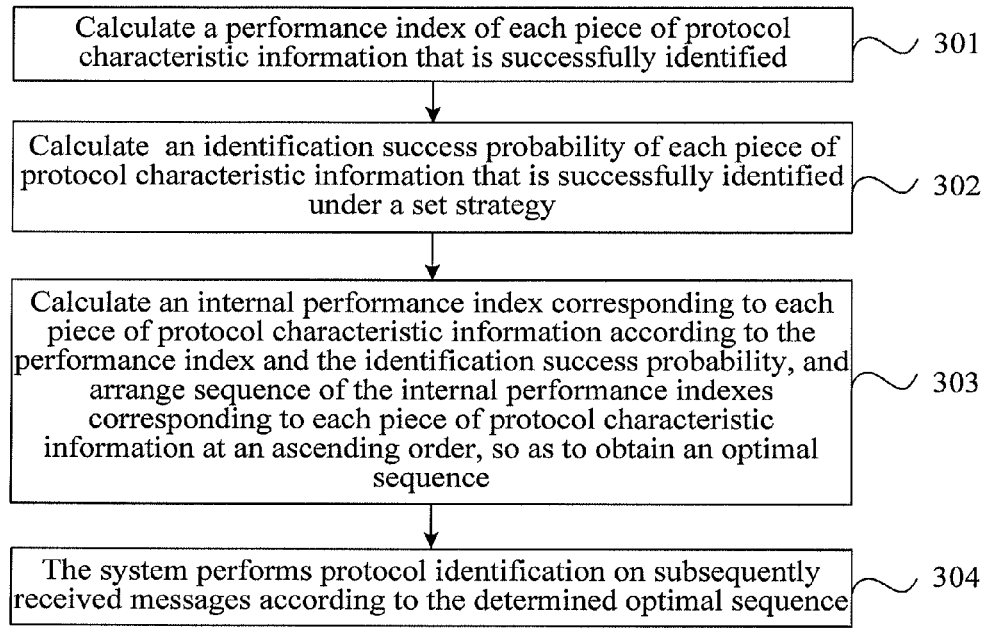
FIG. 5 is a flow chart of a third embodiment of a protocol identification method according to the present disclosure.

FIG. 5 is a flow chart of a third embodiment of a protocol identification method according to the present disclosure. As shown in FIG. 5, on the basis of the first embodiment of the protocol identification method according to the present disclosure, the protocol identification method includes the following steps:

Step 301: Calculate a performance index R of each piece of protocol characteristic information that is successfully identified. A specific method may be obtained with reference to step 201 in the foregoing embodiment.

Step 302: Calculate an identification success probability P of each piece of protocol characteristic information that is successfully identified under a set strategy. A specific method may be obtained with reference to step 202 in the foregoing embodiment.

Step 303: Calculate an internal performance index sequence corresponding to each piece of protocol characteristic information according to the performance index and the identification success probability, and arrange the internal performance indexes corresponding to each piece of protocol characteristic information at an ascending order, so as to obtain an optimal sequence. For example, it is assumed that there are currently m pieces of protocol characteristic information in total, a performance index corresponding to a pre-match sequence for protocol identification is Rx= (R1, R2, ..., Rm), an identification success probability sequence of protocol characteristics corresponding to each piece of protocol characteristic information is Px= (P1, P2, ..., Pm), the internal performance index Gx=Rx/Px corresponding to each piece of protocol characteristic information is calculated, a sequence (G1, G2, ..., Gm) of the internal performance indexes corresponding to each piece of protocol characteristic information is arranged at an ascending order, and the obtained sequence of protocol characteristic information is an adjusted optimal sequence.

Step 304: The system performs protocol identification on subsequently received messages according to the determined optimal sequence.

In this embodiment, the optimal sequence for protocol identification is determined according to the identification probabilities under the preset statistical strategy and the performance indexes of the protocol characteristic information. The arrangement orders of the protocol characteristic information at different time and in different regions may be different, so that the protocol match performance may be different in a data stream of the same protocol input at different time and in different regions. The protocol characteristic information with a low performance index and a high match success probability may be matched first, which thereby improves the protocol match performance.

Figure 6:
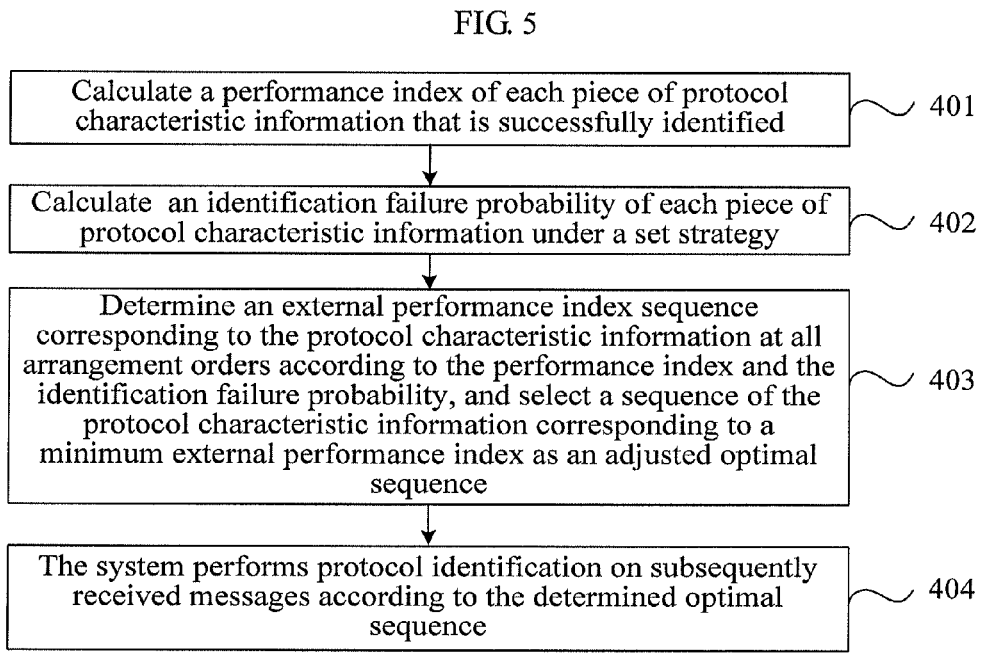
FIG. 6 is a flow chart of a fourth embodiment of a protocol identification method according to the present disclosure.

FIG. 6 is a flow chart of a fourth embodiment of a protocol identification method according to the present disclosure. As shown in FIG. 6, on the basis of the first embodiment of the protocol identification method according to the present disclosure, the protocol identification method includes the following steps:

Step 401: Calculate a performance index R of each piece of protocol characteristic information that is successfully identified. A specific method may be obtained with reference to step 201 in the foregoing embodiment.

Step 402: Calculate an identification failure probability P'x of each piece of protocol characteristic information under a set strategy.

If the set strategy is a set time period, the time may be divided first, which may be automatically completed, or manually set. The granularity of the period of time may be 1 day, 1 week, or 1 year. For example, 1 day is divided into three set time periods (9:00-18:00, 18:00-0:00, and 0:00-9:00). After 1-month operation of a device, an identification failure probability of each piece of protocol characteristic information in the three set time periods is calculated according to a statistical result. When the set strategy is a region or an aging degree of the protocol, a statistical method of the identification probability is similar to that when the time is set. Different from the second and third embodiments of the protocol identification method according to the present disclosure, in this embodiment, the identification failure probability P'x instead of a new identification success probability Px of a protocol characteristic in each period of time is calculated, in which P'x=1−Px.

Step 403: Determine an external performance index sequence corresponding to the protocol characteristic information at all arrangement orders according to the performance index and the identification failure probability, and select a sequence of the protocol characteristic information corresponding to a minimum external performance index as an adjusted optimal sequence. For example, it is assumed a system includes m pieces of protocol characteristic information, a performance index corresponding to a pre-match sequence for protocol identification is Rx=(R1, R2, ..., Rm), a sequence of the identification failure probabilities corresponding to each piece of protocol characteristic information is P'x=(P'1, P'2, ..., P'm), an external performance index corresponding to the m pieces of protocol characteristic information at each arrangement order is Q'x=F(Rx, P'x), the arrangement order of the m pieces of protocol characteristic information is adjusted to obtain the external performance indexes corresponding to the m pieces of protocol characteristic information at different arrangement orders, and an external performance index sequence corresponding to the protocol characteristic information at all arrangement orders is determined to be (Q1, Q2, ..., Qn), in which m is an positive integer, n is a number of permutation and combination of the m pieces of protocol characteristic information. A minimum external performance index Q'i=min(Q'1, Q'2, ..., Q'm) is selected, sequence R'i of the protocol characteristic information corresponding to the Q'i is the sequence having the highest match efficiency, and is used as the adjusted optimal sequence.

Step 404: The system performs protocol identification on subsequently received messages according to the determined optimal sequence.

In this embodiment, the optimal sequence for protocol identification is determined according to the identification probabilities under the preset statistical strategy and the performance indexes of the protocol characteristic information. The arrangement orders of the protocol characteristic information at different time and in different regions may be different, so that the protocol match performance may be different in a data stream of the same protocol input at different time and in different regions. Therefore, the protocol characteristic information with a high performance index and a high match failure probability may be matched later, which thereby improves the protocol match performance.

Figure 7:
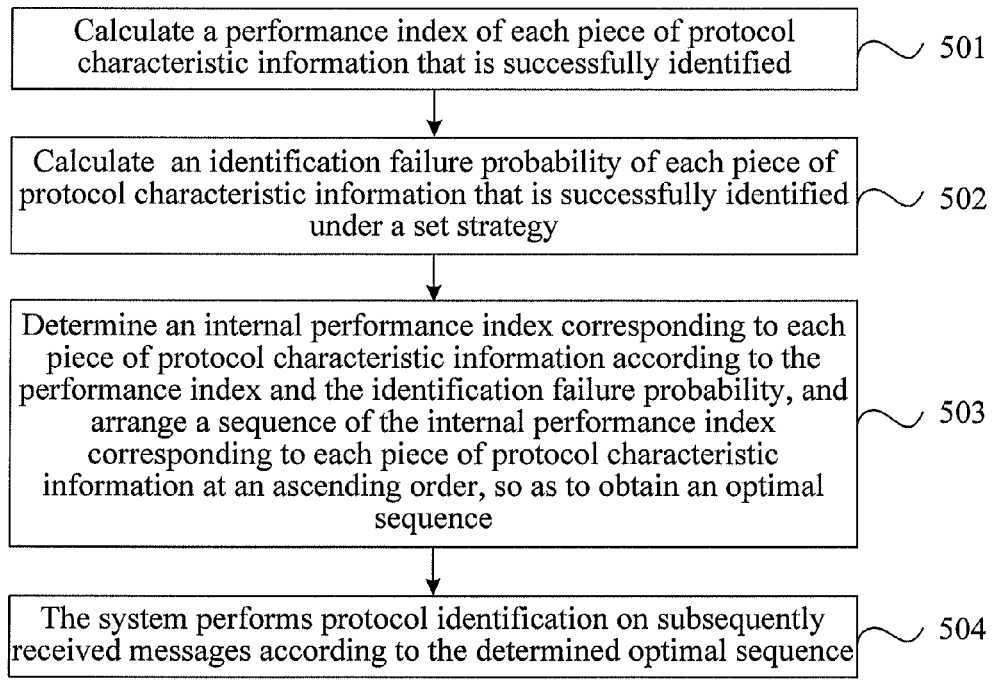
FIG. 7 is a flow chart of a fifth embodiment of a protocol identification method according to the present disclosure.

FIG. 7 is a flow chart of a fifth embodiment of a protocol identification method according to the present disclosure. As shown in FIG. 7, on the basis of the first embodiment of the protocol identification method according to the present disclosure, the protocol identification method includes the following steps:

Step 501: Calculate a performance index R of each piece of protocol characteristic information that is successfully identified. A specific method may be obtained with reference to step 201 in the foregoing embodiment.

Step 502: Calculate an identification failure probability P'x of each piece of protocol characteristic information under a set strategy. A specific method may be obtained with reference to step 402 in the foregoing embodiment.

Step 503: Determine an internal performance index sequence corresponding to each piece of protocol characteristic information according to the performance index and the identification failure probability, and arrange a sequence of the internal performance index corresponding to each piece of protocol characteristic information at an ascending order, so as to obtain an optimal sequence. For example, it is assumed a system includes m pieces of protocol characteristic information, a performance index corresponding to a pre-match sequence for protocol identification is Rx=(R1, R2, ..., Rm), a sequence of the identification failure probabilities corresponding to each piece of protocol characteristic information is P'x=(P'1, P'2, ..., P'm), an internal performance index G'x=Rx*P'x corresponding to each piece of protocol characteristic information is calculated, a sequence (G'1, G'2, ..., G'm) of the internal performance index corresponding to each piece of protocol characteristic information is arranged at an ascending order, and the obtained sequence of the protocol characteristic information is the adjusted optimal sequence.

Step 504: The system performs protocol identification on subsequently received messages according to the determined optimal sequence.

The embodiments of the protocol identification method may be a dynamic adjustment process, in which calculation is performed once every a certain period of time, and the arrangement order of the protocol characteristic information is adjusted to be the optimal sequence; or may be not a dynamic adjustment process, but implemented as follows. After the optimal sequence is obtained through calculation in advance, the protocol characteristic information is statically arranged according to the optimal sequence. For example, the protocol characteristic information having a high occurrence frequency and a low performance index is arranged at a leading position of the match sequence, and if the match is failed, the protocol characteristic information having a high match performance index is used for matching.

In this embodiment, the optimal sequence for protocol identification is determined according to the identification probabilities under the preset statistical strategy and the performance indexes of the protocol characteristic information. The arrangement orders of the protocol characteristic information at different time and in different regions may be different, so that the protocol match performance may be different in a data stream of the same protocol input at different time and in different regions. Therefore, the protocol characteristic information with a high performance index and a high match failure probability may be matched later, which thereby improves the protocol match performance.

Figure 8:
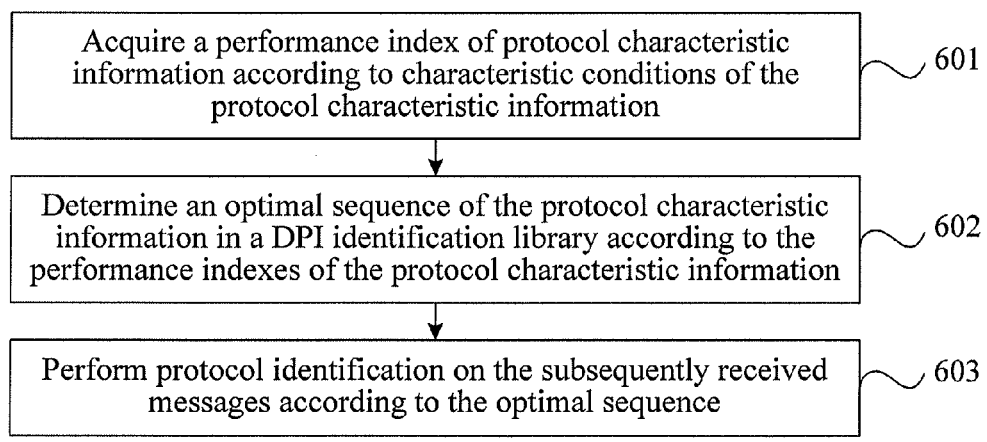
FIG. 8 is a flow chart of a sixth embodiment of a protocol identification method according to the present disclosure.

FIG. 8 is a flow chart of a sixth embodiment of a protocol identification method according to the present disclosure. As shown in FIG. 8, the protocol identification method may include the following steps:

Step 601: Acquire a performance index of protocol characteristic information according to characteristic conditions of the protocol characteristic information, in which the performance indexes represent resource consumption power for successfully identifying the protocol.

Step 601 may include acquiring performance indexes of all characteristic conditions in each piece of protocol characteristic information; and calculating the performance indexes of all the characteristic conditions according to a set algorithm, so as to obtain the performance index of the protocol characteristic information. A specific process may be obtained with reference to related description in the first embodiment of the protocol identification method according to the present disclosure, and FIG. 2.

Step 602: Determine an optimal sequence of the protocol characteristic information in a DPI identification library according to the performance indexes of the protocol characteristic information, in which the optimal sequence is used to determine a precedence order of the protocol characteristic information employed to identify subsequently received messages.

For example, a precedence order of the protocol characteristic information employed to identify subsequently received messages is determined following an order from low to high of the performance indexes.

Step 603: Perform protocol identification on the subsequently received messages according to the optimal sequence.

In this embodiment, the optimal sequence for protocol identification is determined according to the performance indexes of the protocol characteristic information. The arrangement orders of the protocol characteristic information at different time and in different regions may be different, so that the protocol match performance may be different for the messages in a data stream of the same protocol input at different time and in different regions. Therefore, the protocol characteristic information with a low performance index may be matched first, and the protocol characteristic information with a high performance index may be matched later, which thereby improves the protocol match performance.

Figure 9:
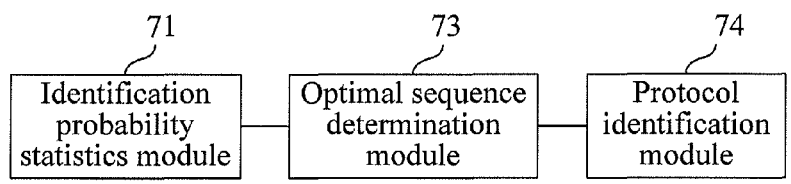
FIG. 9 is a schematic structural diagram of a first embodiment of a protocol identification device according to the present disclosure.

FIG. 9 is a schematic structural diagram of a first embodiment of a protocol identification device according to the present disclosure. As shown in FIG. 9, the protocol identification device may include an identification probability statistics module 71, an optimal sequence determination module 73, and a protocol identification module 74.

The identification probability statistics module 71 is configured to calculate identification probabilities of protocol characteristic information employed by DPI according to an identification result of the DPI performed on a received message, in which the identification probabilities represent the probability that the protocol characteristic information is employed according to a preset statistical strategy The optimal sequence determination module 73 is configured to determine an optimal sequence of the protocol characteristic information in a DPI identification library according to magnitudes of the identification probabilities, in which the optimal sequence is used to determine a precedence order of the protocol characteristic information employed to identify subsequently received messages.

The protocol identification module 74 is configured to perform protocol identification on the subsequently received messages according to the optimal sequence.

For example, each piece of protocol characteristic information in the DPI identification library has a corresponding performance index; the identification probability statistics module 71 makes statistics, according to the identification result of the DPI, on the probabilities of whether the protocol characteristic information is employed by the DPI under the preset statistical strategy, that is, on identification success probabilities or identification failure probabilities; and then the optimal sequence determination module 73 may determine the optimal sequence of all protocol characteristic information in the DPI identification library according to the identification probabilities of the protocol characteristic information; and finally the protocol identification module 74 is configured to perform protocol identification on subsequently received messages according to the optimal sequence. Enabling the protocol identification device according to the embodiment of the present disclosure may be controlled by a switch, and the switch may be a physical switch or a logic code command. The protocol identification device may be disposed separately, or integrated into a network aggregation device, for example, a DPI device or a network management device product. An output value of each module of the protocol identification device may be determined by an operation result of each module, or be a preset output value. Each module of the protocol identification device may determine an optimal sequence at a certain time interval, and make a real time update of the optimization strategy, or determine an optimization strategy at the beginning of the protocol identification, and then persistently employ the optimization strategy for protocol identification.

In this embodiment, the optimal sequence determination module determines the optimal sequence for protocol identification according to the identification probabilities under the preset statistical strategy. The arrangement orders of the protocol characteristic information at different time and in different regions may be different, so that the protocol match performance may be different for the messages in a data stream of the same protocol input at different time and in different regions. Therefore, the protocol characteristic information with a high match success probability may be matched first, and the protocol characteristic information with a match failure probability may be matched later, which thereby improves the protocol match performance.

Figure 10:
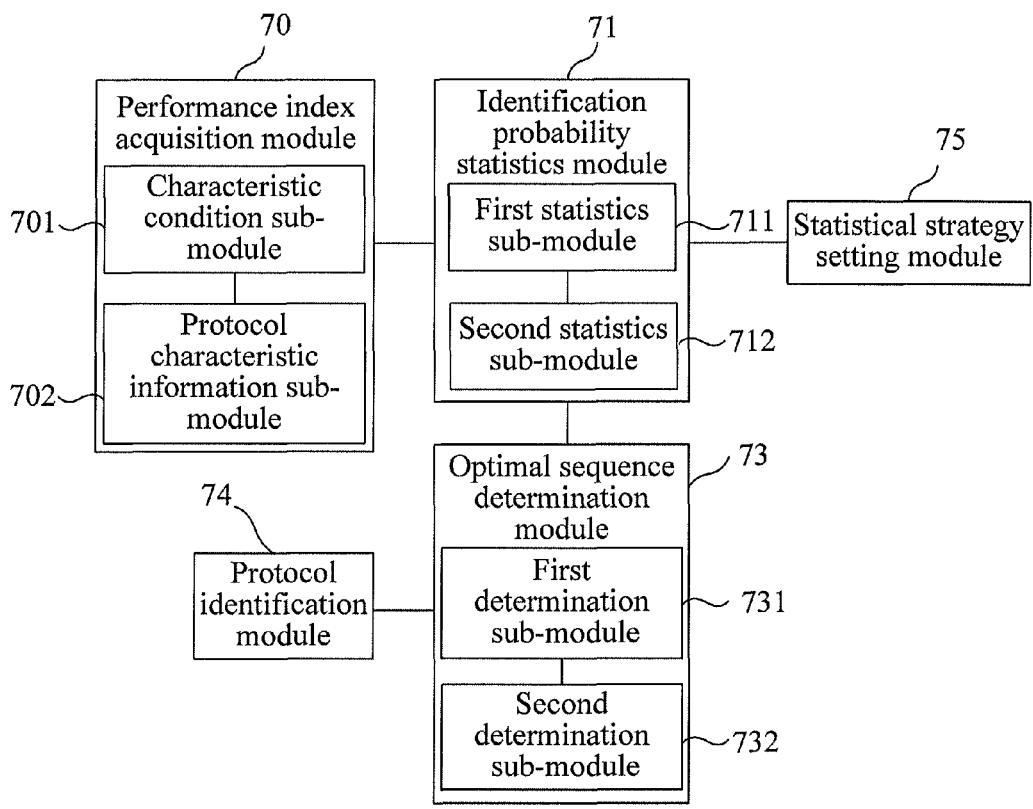
FIG. 10 is a schematic structural diagram of a second embodiment of a protocol identification device according to the present disclosure.

FIG. 10 is a schematic structural diagram of a second embodiment of a protocol identification device according to the present disclosure. As shown in FIG. 10, on the basis of the first embodiment of the protocol identification device according to the present disclosure, the protocol identification device may further include a performance index acquisition module 70 and/or a statistical strategy setting module 75.

The performance index acquisition module 70 is configured to acquire a performance index of the protocol characteristic information according to characteristic conditions of the protocol characteristic information, in which the performance indexes represent resource consumption power for successfully identifying the protocol. A specific method for acquiring the performance indexes of the protocol characteristic information by the performance index acquisition module may be obtained with reference to related descriptions in the first and second embodiments of the protocol identification method according to the present disclosure.

The statistical strategy setting module 75 is configured to preset the preset statistical strategy, in which the preset statistical strategy comprises any one of a set time period, a set region, and a set aging degree of a protocol. A specific method for presetting the preset statistical strategy by the statistical strategy setting module may be obtained with reference to related descriptions in the first and second embodiments of the protocol identification method according to the present disclosure.

In addition, the performance index acquisition module 70 may include a characteristic condition sub-module 701 and a protocol characteristic information sub-module 702.

The characteristic condition sub-module 701 is configured to acquire performance indexes of all characteristic conditions in each piece of protocol characteristic information.

The protocol characteristic information sub-module 702 is configured to calculate the performance indexes of all the characteristic conditions according to a set algorithm, so as to obtain the performance index of the protocol characteristic information. A specific process may be obtained with reference to related descriptions in the first and second embodiments of the protocol identification method according to the present disclosure, and FIG. 2.

In addition, the identification probability statistics module 71 may include a first statistics sub-module 711 and/or a second statistics sub-module 712.

The first statistics sub-module 711 is configured to calculate identification success probabilities of the protocol characteristic information employed by the DPI under a preset statistical strategy according to an identification result of the DPI performed on the received message. A specific method for determining the identification success probabilities by the first statistics sub-module may be obtained with reference to related descriptions in the first, second and third embodiments of the protocol identification method according to the present disclosure.

The second statistics sub-module 712 is configured to calculate identification failure probabilities of the protocol characteristic information employed by the DPI under the preset statistical strategy according to the identification result of the DPI performed on the received message. A specific method for determining the identification failure probabilities by the second statistics sub-module may be obtained with reference to related descriptions in the first, fourth and fifth embodiments of the protocol identification method according to the present disclosure.

Furthermore, the optimal sequence determination module 73 may includes a first determination sub-module 731 and/or a second determination sub-module 732.

The first determination sub-module 731 is configured to calculate, based on a preset function relation, external performance indexes corresponding to all the protocol characteristic information at different arrangement orders in the DPI identification library according to the performance indexes and the identification probabilities of the protocol characteristic information, and determine an arrangement order with a minimum external performance index to be the optimal sequence. A specific method for determining the optimal sequence by the first determination sub-module according to the external performance indexes may be obtained with reference to related descriptions in the first, second and third embodiments of the protocol identification method according to the present disclosure.

The second determination sub-module 732 is configured to calculate internal performance indexes corresponding to all the protocol characteristic information in the DPI identification library according to the performance indexes and the identification probabilities of the protocol characteristic information, and determine an arrangement order of all the protocol characteristic information arranged according to an ascending order of the internal performance indexes as the optimal sequence, in which the internal performance indexes are ratios of the performance indexes to the identification success probabilities corresponding to the performance indexes, or products of the performance indexes and the identification failure probabilities corresponding to the performance indexes. A specific method for determining the optimal sequence by the second determination sub-module according to the internal performance indexes may be obtained with reference to related descriptions in the first, fourth and fifth embodiments of the protocol identification method according to the present disclosure.

In this embodiment, each sub-module of the optimal sequence determination module may determine the optimal sequence for protocol identification according to the identification probabilities under the preset statistical strategy and the performance indexes of the protocol characteristic information. The arrangement orders of the protocol characteristic information at different time and in different regions may be different, so that the protocol match performance may be different for the messages in a data stream of the same protocol input at different time and in different regions. Therefore, the protocol characteristic information with a low performance index and a high match success probability may be matched first, and the protocol characteristic information with a high performance index and a high match failure probability may be matched later, which thereby improves the protocol match performance.

Figure 11:
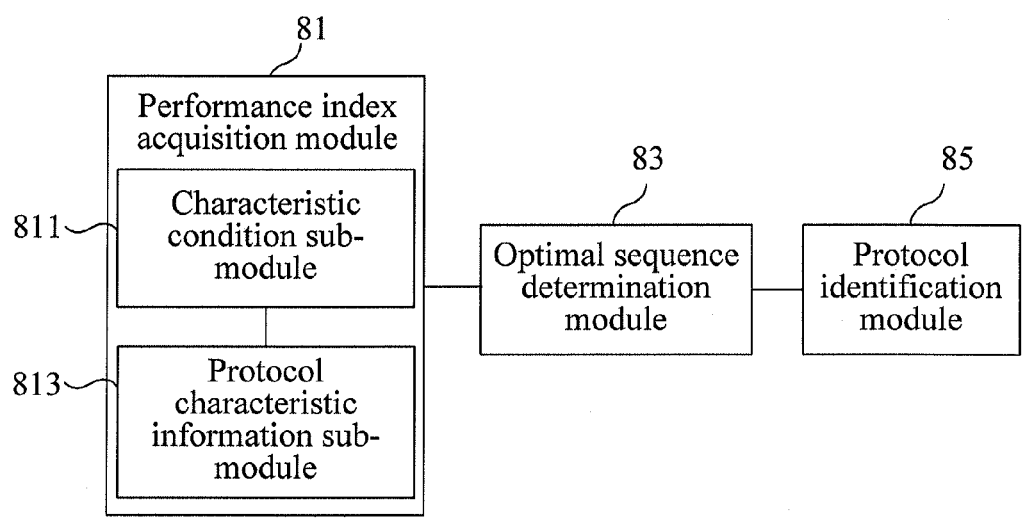
FIG. 11 is a schematic structural diagram of a third embodiment of a protocol identification device according to the present disclosure.

FIG. 11 is a schematic structural diagram of a third embodiment of a protocol identification device according to the present disclosure. As shown in FIG. 11, the protocol identification device may include a performance index acquisition module 81, an optimal sequence determination module 83, and a protocol identification module 85.

The performance index acquisition module 81 is configured to acquire a performance index of protocol characteristic information according to characteristic conditions of the protocol characteristic information, in which the performance indexes represent resource consumption power for successfully identifying the protocol.

The optimal sequence determination module 83 is configured to determine an optimal sequence of the protocol characteristic information in a DPI identification library according to the performance indexes of the protocol characteristic information, in which the optimal sequence is used to determine a precedence order of protocol characteristic information employed to identify subsequently received messages.

The protocol identification module 85 is configured to perform protocol identification on the subsequently received messages according to the optimal sequence. A specific method for acquiring the protocol characteristic information by the performance index acquisition module may be obtained with reference to related descriptions in the first and second embodiments of the protocol identification method according to the present disclosure.

In addition, the performance index acquisition module 81 may include a characteristic condition sub-module 811 and a protocol characteristic information sub-module 813.

The characteristic condition sub-module 811 is configured to acquire performance indexes of all characteristic conditions in each piece of protocol characteristic information.

The protocol characteristic information sub-module 813 is configured to calculate the performance indexes of all the characteristic conditions according to a set algorithm, so as to obtain the performance index of the protocol characteristic information. A specific process may be obtained with reference to related descriptions in the first and second embodiments of the protocol identification method according to the present disclosure, and FIG. 2.

In this embodiment, the optimal sequence determination module may determine the optimal sequence for protocol identification according to the performance indexes of the protocol characteristic information. The arrangement orders of the protocol characteristic information at different time and in different regions may be different, so that the protocol match performance may be different for the messages in a data stream of the same protocol input at different time and in different regions. Therefore, the protocol characteristic information with a low performance index may be matched first, and the protocol characteristic information with a high performance index may be matched later, which thereby improves the protocol match performance.

Persons skilled in the art should understand that all or a part of the steps of the methods according to the embodiments may be implemented by a program instructing relevant hardware. For example, the protocol identification device may be a server that includes at least one processor and a computer storage medium that is accessible to the at least one processor. The program may be stored in a computer readable storage medium. When the program is run, the steps of the methods according to the embodiments are performed. The storage medium may be any medium that is capable of storing program codes, such as a ROM, a RAM, a magnetic disk, and an optical disk. Finally, it should be noted that the above embodiments are merely provided for describing the solutions of the present disclosure, but not intended to limit the present disclosure. It should be understood by persons skilled in the art that although the present disclosure has been described in detail with reference to the foregoing embodiments, modifications may be made to the solutions described in the foregoing embodiments, or equivalent replacements may be made to some features in the solutions, as long as such modifications or replacements do not cause the essence of corresponding solutions to depart from the spirit and protection scope of the present disclosure.

What is claimed is:

1. A protocol identification method, comprising:
    calculating identification probabilities of protocol characteristic information employed by Deep Packet Inspection according to an identification result of the Deep Packet Inspection performed on a received message, wherein the identification probabilities comprise a probability that the protocol characteristic information is employed according to a preset statistical strategy;
    determining an optimal sequence of the protocol characteristic information in a Deep Packet Inspection identification library according to the identification probabilities, wherein the optimal sequence determines a precedence order of the protocol characteristic information employed to identify subsequently received messages; and
    performing protocol identification on the subsequently received messages according to the optimal sequence.

2. The protocol identification method according to claim 1, further comprising:
    acquiring a performance index of the protocol characteristic information according to characteristic conditions of the protocol characteristic information, wherein the performance index represents resource consumption power for successfully identifying the protocol.

3. The protocol identification method according to claim 2, wherein acquiring the performance index of the protocol characteristic information according to the characteristic conditions of the protocol characteristic information comprises:
    acquiring performance indexes of all characteristic conditions in each piece of protocol characteristic information; and
    calculating the performance indexes of all the characteristic conditions according to a set algorithm, so as to obtain the performance index of the protocol characteristic information.

4. The protocol identification method according to claim 2, wherein determining the optimal sequence of the protocol characteristic information in the Deep Packet Inspection identification library according to the identification probabilities comprises:
    calculating, based on a preset function relation, external performance indexes corresponding to all the protocol characteristic information at different arrangement orders in the Deep Packet Inspection identification library according to the performance index and the identification probabilities of the protocol characteristic information, and determining an arrangement order with a minimum external performance index to be the optimal sequence; or
    calculating internal performance indexes corresponding to all the protocol characteristic information in the Deep Packet Inspection identification library according to the performance index and the identification probabilities of the protocol characteristic information, and determining an arrangement order of all the protocol characteristic information arranged according to an ascending order of the internal performance index as the optimal sequence, wherein the internal performance indexes are ratios of the performance indexes to the identification success probabilities corresponding to the performance indexes, or products of the performance indexes and the identification failure probabilities corresponding to the performance indexes.

5. The protocol identification method according to claim 1, wherein calculating the identification probabilities of the protocol characteristic information employed by the Deep Packet Inspection according to the identification result of the Deep Packet Inspection performed on the received message comprises:
    calculating identification success probabilities of the protocol characteristic information employed by the Deep Packet Inspection under a preset statistical strategy according to the identification result of the Deep Packet Inspection performed on the received message; or
    calculating identification failure probabilities of the protocol characteristic information employed by the Deep Packet Inspection under a preset statistical strategy according to the identification result of the Deep Packet Inspection performed on the received message.

6. The protocol identification method according to claim 1, further comprising:
    presetting the preset statistical strategy, wherein the preset statistical strategy comprises any one of a set time period, a set region, and a set aging degree of a protocol.

7. A protocol identification method, comprising:
    acquiring a performance index of protocol characteristic information according to characteristic conditions of the protocol characteristic information, wherein the performance index represents resource consumption power for successfully identifying the protocol;
    determining an optimal sequence of the protocol characteristic information in a Deep Packet Inspection identification library according to the performance index of the protocol characteristic information, wherein the optimal sequence determines a precedence order of protocol characteristic information employed to identify subsequently received messages; and performing protocol identification on the subsequently received messages according to the optimal sequence.

8. The protocol identification method according to claim 7, wherein acquiring the performance index of the protocol characteristic information according to the characteristic conditions of the protocol characteristic information comprises:

acquiring performance indexes of all characteristic conditions in each piece of protocol characteristic information; and calculating the performance indexes of all the performance indexes according to a set algorithm, so as to obtain the performance index of the protocol characteristic information.

9. A protocol identification device, comprising at least a processor executing codes stored on a non-transitory computer-readable storage medium to perform functions as a plurality of modules, the plurality of modules comprising:

an identification probability statistics module, which causes the at least one processor to perform calculation of identification probabilities of protocol characteristic information employed by Deep Packet Inspection according to an identification result of the Deep Packet Inspection performed on a received message, wherein the identification probabilities represent the probability that the protocol characteristic information is employed according to a preset statistical strategy;

an optimal sequence determination module, which causes the at least one processor to perform determination of an optimal sequence of the protocol characteristic information in a Deep Packet Inspection identification library according to the identification probabilities, wherein the optimal sequence determines a precedence order of the protocol characteristic information employed to identify subsequently received messages; and a protocol identification module, which causes the at least one processor to perform protocol identification on the subsequently received messages according to the optimal sequence.

10. The protocol identification device according to claim 9, wherein the plurality of modules further comprising:

a performance index acquisition module, which causes the at least one processor to acquire a performance index of the protocol characteristic information according to characteristic conditions of the protocol characteristic information, wherein the performance index represents resource consumption power for successfully identifying the protocol; and/or a statistical strategy setting module, which causes the at least one processor to preset the preset statistical strategy, wherein the preset statistical strategy comprises any one of a set time period, a set region, and a set aging degree of a protocol.

11. The protocol identification device according to claim 10, wherein the performance index acquisition module comprises:

a characteristic condition sub-module, which causes the at least one processor to acquire performance indexes of all characteristic conditions in each piece of protocol characteristic information; and a protocol characteristic information sub-module, which causes the at least one processor to calculate the performance indexes of all the characteristic conditions according to a set algorithm, so as to obtain the performance index of the protocol characteristic information.

12. The protocol identification device according to claim 9, wherein the identification probability statistics module further comprises:

a first statistics sub-module, which causes the at least one processor to calculate identification success probabilities of the protocol characteristic information employed by the Deep Packet Inspection under a preset statistical strategy according to the identification result of the Deep Packet Inspection performed on the received message; and/or a second statistics sub-module, which causes the at least one processor to calculate identification failure probabilities of the protocol characteristic information employed by the Deep Packet Inspection under a preset statistical strategy according to the identification result of the Deep Packet Inspection performed on the received message.

13. The protocol identification device according to claim 9, wherein optimal sequence determination module comprises:

a first determination sub-module, which causes the at least one processor to calculate, based on a preset function relation, external performance indexes corresponding to all the protocol characteristic information at different arrangement orders in the Deep Packet Inspection identification library according to the performance index and the identification probabilities of the protocol characteristic information, and determine an arrangement order with a minimum external performance index to be the optimal sequence; and/or a second determination sub-module, which causes the at least one processor to calculate internal performance indexes corresponding to all the protocol characteristic information in the Deep Packet Inspection identification library according to the performance index and the identification probabilities of the protocol characteristic information, and determine an arrangement order of all the protocol characteristic information arranged according to an ascending order of the internal performance indexes as the optimal sequence, wherein the internal performance indexes are ratios of the performance indexes to the identification success probabilities corresponding to the performance indexes, or products of the performance indexes and the identification failure probabilities corresponding to the performance indexes.

14. A protocol identification device, comprising at least a processor executing codes stored on a non-transitory computer-readable storage medium to perform functions as a plurality of modules, the plurality of modules comprising:

a performance index acquisition module, which causes the at least one processor to acquire a performance index of protocol characteristic information according to characteristic conditions of the protocol characteristic information, wherein the performance index represents resource consumption power for successfully identifying the protocol;

an optimal sequence determination module, which causes the at least one processor to determine an optimal sequence of the protocol characteristic information in a Deep Packet Inspection identification library according to the performance index of the protocol characteristic information, wherein the optimal sequence determines a precedence order of protocol characteristic information employed to identify subsequently received messages; and a protocol identification module, configured to perform protocol identification on the subsequently received messages according to the optimal sequence.

15. The protocol identification device according to claim 14, wherein the performance index acquisition module comprises:
- a characteristic condition sub-module, which causes the at least one processor to acquire performance indexes of all characteristic conditions in each piece of protocol characteristic information; and
- a protocol characteristic information sub-module, configured to calculate the performance indexes of all the characteristic conditions according to a set algorithm, so as to obtain the performance index of the protocol characteristic information.

* * * * *